United States Patent [19]

Koster et al.

[11] Patent Number: 4,481,695
[45] Date of Patent: Nov. 13, 1984

[54] WIRE ROPE CONNECTOR WITH LENGTH ADJUSTMENT CAPACITY

[75] Inventors: Karl H. Koster, Essen; Roland Günther, Wesel, both of Fed. Rep. of Germany

[73] Assignee: AUMOND-Fördererbau GmbH Maschinenfabrik, Fed. Rep. of Germany

[21] Appl. No.: 423,150

[22] Filed: Sep. 24, 1982

[30] Foreign Application Priority Data

Oct. 27, 1981 [DE] Fed. Rep. of Germany ....... 3142572

[51] Int. Cl.³ ................................................ F16G 3/00
[52] U.S. Cl. ....................................... 24/32; 24/31 F; 24/115 H; 24/132 R; 403/370; 474/255
[58] Field of Search ................... 24/16 PB, 18, 115 G, 24/115 H, 115 M, 115 L, 115 R, 132 WL, 134 N, 136 R, 136 L, 136 K, 136 A, 263 A, 263 SW, 263 B, 263 CA, 263 DB, 31 R, 31 C, 31 F, 32, 37, 38, 68 B, 71.1, 71.2, 128, 114.5, 132 R, 269; 198/844, 850, 731, 711, 692, 698, 699; 474/253, 255, 257; 403/370, 371, 374

[56] References Cited

U.S. PATENT DOCUMENTS 1,737,406 11/1929 Bocchino ...................... 24/115 R X
2,557,877 6/1951 Kluson ......................... 24/115 R X
3,401,924 9/1968 Hurst .
4,336,636 6/1982 Ishiguro et al. .............. 24/136 K X

FOREIGN PATENT DOCUMENTS 114719 11/1900 Fed. Rep. of Germany ...... 24/31 F
107636 7/1917 United Kingdom ............. 24/136 K Primary Examiner—William E. Lyddane
Assistant Examiner—James R. Brittain
Attorney, Agent, or Firm—McGlew and Tuttle

[57] ABSTRACT

A connection unit, which may be undone, for rope ends and more particularly ropes in the form of belts for driving systems, rope conveyors or ropes for lifting loads has, as part of a preferred example, a plate with two rope keepers supported on pins and which keep the rope ends in position thereon by way of stops. These rope end keepers or takeup parts are designed so that they may be turned and locked in position so that, dependent on the direction of turning, the rope may be taken up and made shorter or let off and made longer. The plate, as part of a further example of the invention, has guide parts for positively guiding the rope end and furthermore there is a guiding structure, designed to match the form of a driving sheave so that it may be run thereover.

11 Claims, 3 Drawing Figures

WIRE ROPE CONNECTOR WITH LENGTH ADJUSTMENT CAPACITY

FIELD AND BACKGROUND OF THE INVENTION

The present invention relates to a unit for connecting or joining together the ends of ropes, and particularly the ropes in rope-belt driving systems, rope conveyors or rope lifting systems, for example rope systems forming part of a rotary drying plant, so that the rope ends may be unjoined when desired.

One known way of joining the ends of wire ropes together is by way of short or long splices (see German Industrial Standard or DIN 83318). However there is then no chance for the adjustment of such a joint or for the unjoining of the two rope ends.

It is furthermore possible (see DIN 3092) for the ends of wire ropes to be joined together in special joining fittings with pieces of metal cast on the rope ends taken up in sleeves. Such joining fittings are show for example in German Offenlegungsschrift specification Nos. 2,235,475 and 1,900,909.

A further type of rope joining unit with ends of the two ropes crossed over in a swaged-on fitting is shown in German Offenlegungsschrift specification No. 2,200,523.

Furthermore there are a great number of different swaged-on connections with thimbles in special connection pieces.

Some of all known forms of connection permit the two rope ends disconnected from each other. Among these, very few can be used in systems with driving sheaves because it is only in a limited number of cases that such connections can move past and over such sheaves. If in a rope system a number of ropes are placed parallel to each other and joined in separate loops, it is not possible in the prior art to make any adjustment in length of the loops so that they all have the same length. The lengths however are likely to be unequal because of manufacturing tolerances or stretch. Furthermore, there is an uneven loading of ropes if the turning parts of machines used therewith are changed in position.

SUMMARY OF THE INVENTION

One purpose of the present invention is to provide a unit for connecting the ends of ropes together which permits the ropes to be unjoined from each other and furthermore gives the user a chance to join the rope ends using an adjustable length of each rope end.

According to the invention, the two rope ends are kept in position in a specially formed plate, and one of the rope ends is locked on a keeper part, which may undergo adjustment on the plate in such a way that by such adjustment the rope length may be changed.

In a preferred form of the invention two adjustable rope keeper parts are present on the plate for taking up the two rope ends.

As a possible further development of the invention the rope keeper parts may be in the form of rope takeup parts which may be turned on pins on the plate and locked in position.

With respect to a further detail of the invention, the rope keeper or takeup part may have stops for holding the two rope ends.

Furthermore, as a further part of the invention each stop may be designed for taking up a cast-on metal part on the rope lying within a sleeve.

In a more desirable development of the invention, the takeup parts may be locked against turning by friction connections on the pins of the plate. Such a friction connection may for example be in the form of jaws using wedges and screws for holding them tightly together.

As part of a still further preferred form of the invention the plate may have specially formed parts for guiding the ends of the rope positively to the takeup parts.

It is furthermore possible for the plate to have a guide piece matching the form of a driving sheave and its rope groove, this being for the purpose of making certain of an even running of the unit without any disturbance, over such a driving sheave.

In the case of this working example of the invention it is preferred for the rope end to be guided between the specially formed parts and the guide piece towards the takeup part.

Further useful developments and details of the invention will be seen in the claims.

It will be clear from what has been said that the invention makes possible a rope connection unit which, while being able to be undone, makes possible the taking up of lengths of rope separately, or the payment out of such lengths while at the same time it may readily be run over a driving sheave, having a rope groove, of a rope transmission or driving system. The apparatus of the invention may furthermore be equally well used for ropes of large diameter and high rope speeds, because the possible rope forces may readily be transmitted by the connection unit of the invention.

BRIEF DESCRIPTION OF THE DRAWINGS

In the figures

DESCRIPTION OF THE PREFERRED EMBODIMENT

Figure 1:
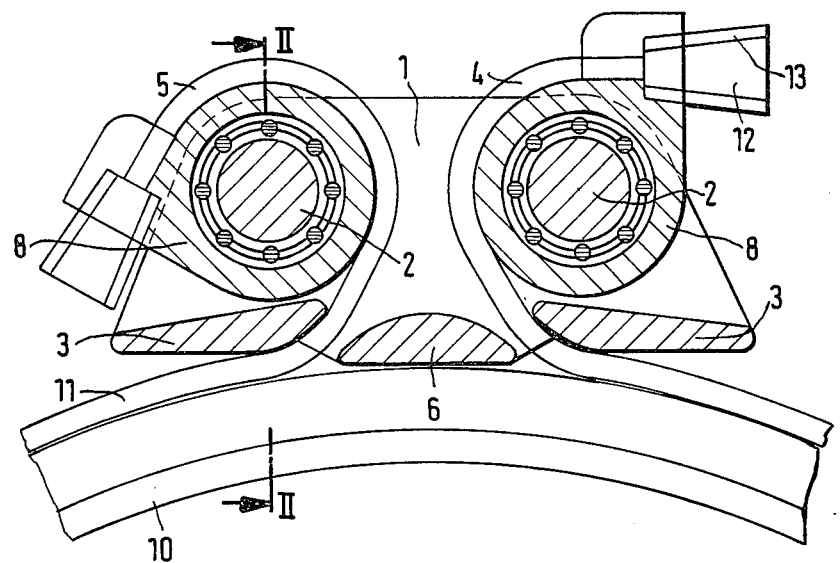
FIG. 1 is a side view and section of the connection unit of the invention shown running over a driving sheave.

Referring to the drawings, in particular, the invention therein is made up of a specially formed plate 1 having two pins 2 forming a single piece of material therewith. Near the lower edge of plate 1, generally opposite to pins 2, there are two guide structures or formed pieces 3, which again are in the form of a single piece of material with the plate and have the purpose of positively guiding the two rope ends 4, 5. To this end guiding structures 3 have shallow rope grooves 9 (see FIG. 2).

Figure 3:
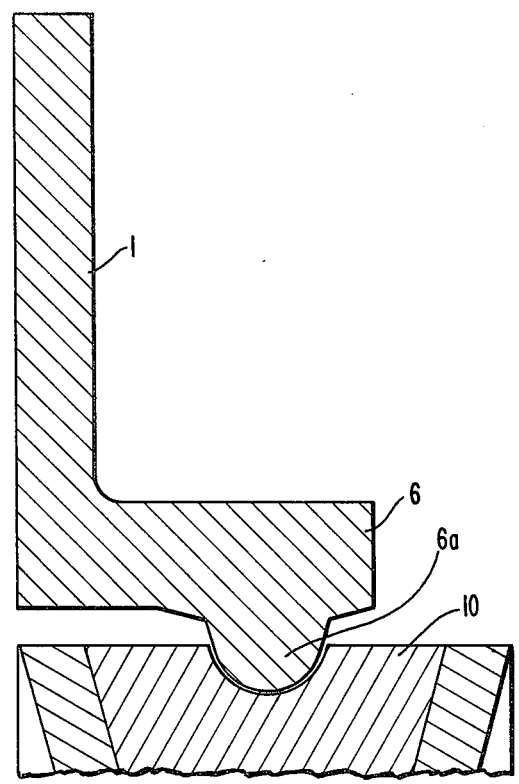
FIG. 3 is a sectional view taken parallel to line II—II in FIG. 1, but through the guide piece 6.

Between the guiding structures 3 there is a guide piece 6, which again is made of the same piece of material as the plate 1 and which is near its lower edge. As shown in FIG. 3 guide piece 6 has a shape at 6a designed for the purpose of matching the form of the driving sheave 10 and the rope groove thereon so as to provide smooth running of the connection unit of the invention over the sheave. Putting it somewhat differently, it may be said that guide piece 6 has a form generally answering the cross-section of the rope 11, the form of guide piece 6 possibly having guide faces (not shown)

to the sides thereof for resting on the ungrooved, free outer face of driving sheave or pulley 10.

On the pins 2 separate takeup parts 8 (one for each of the two rope ends 4 and 5) are fixed by way of a friction means or shaft-hub connection 7, each such rope takeup part 8 at the same time forming a stop for the rope end 4 or 5 as the case may be.

As may be seen from the figures the rope ends more specially have cast-on metal parts 13 taken up in rope sleeves 12. In the present working example the stops for the rope end terminals are in the form of forked heads 14 in each case formed in one piece with the takeup part 8 and designed for lockingly taking up the rope sleeves 12.

Figure 2:
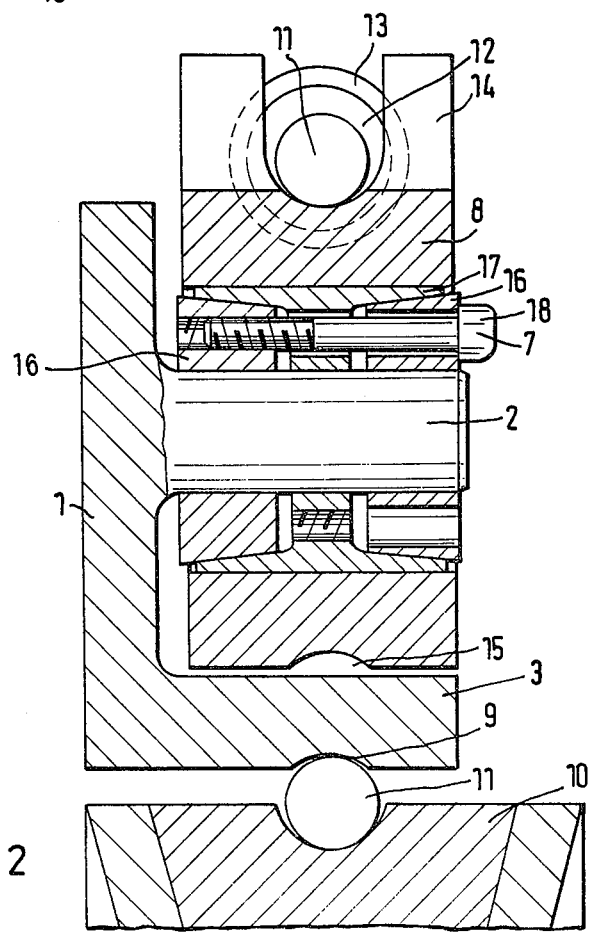
FIG. 2 is a sectional view taken on the line II—II in FIG. 1.

As may be seen from FIG. 2, each rope takeup part 8 as well has a rope groove 15 so that the rope end 4 or 5 is positively guided from the guiding structures 3 as far as the forked head 14 round the takeup part 8.

In the present working example of the invention the friction means 7 for friction-locking of the rope takeup parts 8 on pins 2 is made up of annular wedges 16, 16 mounted on a gripping sleeve 17 and screws 18. It will be clear that a person trained in the art will come across many other friction or positive locking systems for the same purpose without giving up the general idea of the present invention.

Screw 18 is shown extending through a bore in the right-hand wedge 16 and a bore in sleeve 17. Screw 18 is threaded into the left-hand wedge 16 so that when screw 18 is tightened, wedges 16,16 are drawn together to deform gripping sleeve 17 slightly outwardly to engage tightly with the inner surface of take-up part 8. Below pin 2 in FIG. 2, the right-hand wedge 16 is shown to have a bore which is in alignment with a threaded bore in the sleeve 17. These bores are utilized to receive another screw (not shown) which is threaded into the threaded bore of sleeve 17 until it abuts against the left-hand wedge 16. This can be utilized to help disengage the wedges from the sleeve for permitting rotation of take-up part 8.

In the present working example, after letting off the shaft-hub connection or friction means 7 somewhat it will be possible for the rope takeup part 8 to be turned with the rope end 4 and 5 thereon so that, dependent on the direction of turning, a length of rope may be taken up or let off.

In the case of a somewhat changed form of the invention (not shown) it is furthermore possible for the takeup part to be turned even while under a load by using connection parts for use with a power driving tool or by way of adjustment screws.

On using adjustment screws, by way of which, when turned, the takeup parts 8 may be turned under load after letting off the shaft-hub connection 7 on pin 2, such an adjustment system may furthermore be used as a safety locking system.

After adjustment of the length of the rope the connection 7 is tightened again so that the rope is locked in position.

In the case of a another form of the invention (not shown) the plate 1 may be part of a vessel in a conveying system, for example one using vessels or pocket-like boxes fixed to support ropes.

It is furthermore possible for the plate 1 to be so designed that one of the rope ends (4 or 5) is fixedly joined thereto so that there is no chance of adjustment, while it is only the other end of the rope which is guided over a takeup part 8.

All measures of the present invention to be seen in the present account, the claims and the figures, and all the useful effects thereof, together with details of the design and form may be important for the invention separately or when grouped together.

We claim:

1. A connection unit for connecting two rope ends together, comprising:
   a plate;
   at least one pin extending from said plate;
   a takeup part mounted for rotation on said at least one pin, said takeup part having a stop for engaging and holding one of the two rope ends, the other of the two rope ends connected to said plate; and
   friction means connected between said takeup part and said at least one pin for holding said takeup part at a selected rotational position on said at least one pin.

2. A connection unit according to claim 1, including a second pin connected to said plate, a second takeup part mounted for rotation on said second pin and having a second stop for engaging and holding the other of the two rope ends, and second friction means connected between said second pin and said second take-up part for holding said second part at a selected rotational position on said second pin.

3. A connection unit according to claim 2, including a sleeve and cast-on metal piece connected to each rope end, said first-mentioned and second stop each shaped to engage the sleeve and cast-on metal of one rope end.

4. A connection unit according to claim 1, wherein said friction means comprises a wedge sleeve having a first wedge surface disposed between said take-up part and said pin, a wedge member having a second wedge surface engaged with said first wedge surface and disposed between said wedge sleeve and said pin, and at least one screw connected between said wedge sleeve and said wedge member for urging said first and second wedge surfaces into engagement with each other.

5. A connection unit according to claim 4, including at least one guiding structure connected to said plate for guiding one of the rope ends to said takeup part.

6. A connection unit according to claim 5, including a guide piece connected to said plate, said guide piece having an outer surface shaped at least partly similar to an outer surface of one of the rope ends so that said connecting unit can ride over a driving sheave adjacent a rope connected to one of the rope ends riding on the driving sheave.

7. A connecting unit according to claim 6, wherein said guide piece is spaced from said guiding structure on said plate, one of the rope ends extending through the space between said guide piece and said guiding structure and to said takeup part.

8. A connection unit according to claim 7, including a second pin connected to said plate, a second takeup part mounted for rotation on said second pin, said second takeup part having a second stop for engaging the other of the two rope ends, and second friction means connected between said second pin and said second takeup part for locking said second takeup part at a selected rotational position, a second guiding structure connected to said plate and spaced from said guide piece on a side of said guide piece opposite from said firt-mentioned guiding structure.

9. A connection unit according to claim 8, wherein said plate, said first-mentioned and second pin, said first-mentioned and second guide structures and said guide piece are all made of a single piece of material.

10. A connection unit according to claim 1, wherein said takeup part has a rope groove therearound which terminates at said stop, for receiving a rope end wrapped at least partly around said takeup part.

11. A connection unit according to claim 1, whrein said stop comprises a fork-like head formed with said take-up part as a single piece of material.

* * * * *